(12) United States Patent
Park et al.

(10) Patent No.: US 11,079,524 B2
(45) Date of Patent: Aug. 3, 2021

(54) NEAR-INFRARED FILTER HAVING CHAMFERED DUMMY REGION AND METHOD OF MANUFACTURING THE SAME

(71) Applicant: UTI INC., Chungcheongnam-do (KR)

(72) Inventors: Deok Young Park, Gyeonggi-do (KR); Jae Young Hwang, Gyeonggi-do (KR); Hak Chul Kim, Chungcheongnam-do (KR); Hyunho Kim, Seoul (KR); Tea Joo Ha, Chungcheongnam-do (KR); Jonghwa Lee, Gyeonggi-do (KR)

(73) Assignee: UTI INC.

( * ) Notice: Subject to any disclaimer, the term of this patent is extended or adjusted under 35 U.S.C. 154(b) by 393 days.

(21) Appl. No.: 16/357,974

(22) Filed: Mar. 19, 2019

(65) Prior Publication Data
US 2019/0310401 A1    Oct. 10, 2019

(30) Foreign Application Priority Data
Apr. 4, 2018   (KR) .......................... 10-2018-0039369

(51) Int. Cl.
*G02B 5/20*     (2006.01)
*G02B 5/28*     (2006.01)
*G02B 5/22*     (2006.01)

(52) U.S. Cl.
CPC .............. *G02B 5/208* (2013.01); *G02B 5/281* (2013.01); *G02B 5/223* (2013.01); *G02B 5/226* (2013.01); *G02B 5/282* (2013.01); *G02B 5/285* (2013.01)

(58) Field of Classification Search
CPC ..... C03B 27/03; C03C 15/00; C03C 17/3417; G02B 5/208; G02B 5/223; G02B 5/226; G02B 5/281; G02B 5/282; G02B 5/285; G03F 7/2002
See application file for complete search history.

(56) References Cited

U.S. PATENT DOCUMENTS

2013/0077185 A1*   3/2013   Jang .................... G02B 5/20
                                                             359/891

* cited by examiner

*Primary Examiner* — Ryan S Dunning
(74) *Attorney, Agent, or Firm* — Mendelsohn Dunleavy, P.C.

(57) ABSTRACT

Disclosed is a near-infrared filter. The near-infrared filter includes a filter-support-seat body including a quadrangular pillar cell region and a dummy region which surrounds the cell region and which is gradually reduced in size from the cell region, and an optical-filter-subdivision layer covering the cell region and the dummy region at a front side and a rear side of the filter-support-seat body based on the path of a light beam which is incident on the front side and penetrates the rear side in the filter-support-seat body. The dummy region has a chamfered side that is slanted obliquely in at least one side of the front side and the rear side of the filter-support-seat body. Further, a method of manufacturing the near-infrared filter is disclosed for each process step.

26 Claims, 16 Drawing Sheets

PRIOR ART

NEAR-INFRARED FILTER HAVING CHAMFERED DUMMY REGION AND METHOD OF MANUFACTURING THE SAME

BACKGROUND OF THE INVENTION

1. Field of the Invention

The present invention relates to a near-infrared filter corresponding to an individual structure for defining a plurality of structures on a glass substrate so that a large quantity of the plurality of structures is separated from the glass substrate in a sheet-like process (SLP), and a method of manufacturing the same.

2. Description of the Related Art

In general, an infrared filter is provided in digital image apparatuses such as a digital camera, a camcorder, a surveillance camera, an infrared surveillance camera, and a rear-view camera for a vehicle, and used therein. Recently, infrared filters have come to be applied to camera modules of mobile phones according to the rapid development of mobile communication devices.

Infrared filters are classified into an infrared-pass filter and an infrared cutoff filter. The infrared-pass filter is provided in an iris recognition camera module of a mobile phone to receive infrared rays from the iris of the user irrespective of whether the user wears glasses or the lens and to enable the iris recognition of the user.

The infrared cutoff filter is provided in the digital camera module of the mobile phone to prevent infrared rays from being incident on an imaging device (a CCD, a CMOS, or a chip for converting an image formed through a lens into a digital signal) and to receive only visible rays, thus capturing an image close to a user's visual experience for the imaging device without a ghost image attributable to infrared rays.

In recent years, the infrared-pass filter or infrared cutoff filter has been mass-produced from a glass substrate by applying a sheet-like process (SLP) to the glass substrate in order to actively respond to the demand of mobile phones. The sheet-like process broadly includes a step of radiating a laser to be applied to a glass substrate, a deposition step, and a separation step, in view of structural changes of the glass substrate.

The step of radiating the laser is performed so that the laser is radiated on the glass substrate to thus perform molding into a plurality of cell regions while being held on the glass substrate. In the deposition step, a photo-functional layer is deposited on the front side and the rear side of the glass substrate so that infrared rays pass through the photo-functional layer or are blocked by the photo-functional layer.

In the separation step, individual cell regions are separated from the glass substrate so that the photo-functional layer is subdivided into layers having areas corresponding to those of the front and rear sides of the individual cell regions along the individual cell regions. However, when a photo-functional subdivision layer is separated from the glass substrate along the individual cell region, the contact time with the laser-processed surface of the glass substrate in the thickness direction of the glass substrate is increased as the thickness of the glass substrate is increased. Accordingly, there is a high probability of tearing at the edge of the photo-functional subdivision layer.

As a demonstration of the disadvantage of the conventional technology according hereto, as shown in FIG. 1, a near-infrared filter 8 has a tear 6 at the edge of a photo-functional subdivision layer 4 in an individual cell region 2 upon separation of the individual cell region from the glass substrate. The tear 6 in the photo-functional subdivision layer 4 causes the loss of the optical control function of the edge of the photo-functional subdivision layer 4 with respect to visible rays and near-infrared rays, which has an adverse optical effect on the center region of the photo-functional subdivision layer 4. Accordingly, the optical properties of the photo-functional subdivision layer 4 are deteriorated as a whole, and the tear acts as a cause of entry of micro-scale foreign matter or formation of cracks.

SUMMARY OF THE INVENTION

Accordingly, the present invention has been made keeping in mind the above problems occurring in the related art, and an object of the present invention is to provide a near-infrared filter and a method of manufacturing the same. The near-infrared filter is useful in preventing tears from being famed at the edge of an optical-filter-subdivision layer on an individual filter-support-seat body when a plurality of filter-support-seat bodies is separated from a reinforced glass substrate, after the plurality of filter-support-seat bodies is famed on the reinforced glass substrate by perforating the reinforced glass substrate at a constant pitch and an optical filter layer is then deposited on the reinforced glass substrate while the plurality of filter-support-seat bodies is held on the reinforced glass substrate.

A near-infrared filter according to the present invention includes a filter-support-seat body including a quadrangular pillar cell region and a dummy region which surrounds the cell region and which is gradually reduced in size from the cell region, and an optical-filter-subdivision layer covering the cell region and the dummy region on a front side and a rear side of the filter-support-seat body based on the path of a light beam which is incident on the front side and penetrates the rear side in the filter-support-seat body. The dummy region has a chamfered side that is slanted obliquely in at least one side of the front side and the rear side of the filter-support-seat body, the optical-filter-subdivision layer allows near-infrared rays to pass therethrough or to be blocked in regions corresponding to the cell region and the dummy region, and has a smooth side with respect to a dummy-internal-projection side, which is in contact with an outside of the filter-support-seat body in the dummy region, and the smooth side is positioned on the same straight line as the dummy-internal-projection side of the dummy region.

The filter-support-seat body may include soda lime glass or aluminosilicate glass.

The filter-support-seat body may further include a reinforcing layer including elements, which are different from elements in the filter-support-seat body, along a surface of the cell region, a surface of the dummy region, and the dummy-internal-projection side of the dummy region beneath the optical-filter-subdivision layer.

The filter-support-seat body may be subjected to reinforcing treatment to have compressive stress on a surface thereof using counter diffusion of alkali ions ($Na^+$) of the filter-support-seat body and alkali ions ($K^+$) of potassium nitrate ($KNO_3$) in a molten-metal bath containing the potassium nitrate ($KNO_3$).

The filter-support-seat body may be tapered from the cell region toward the dummy-internal-projection side at the chamfered side of the dummy region.

The cell region and the dummy region may have a rounded shape at all corners of the cell region, which diagonally face each other, around the chamfered side of at least one side of the front side and the rear side of the filter-support-seat body.

The length of the dummy-internal-projection side may be larger than the thickness of the optical-filter-subdivision layer, based on the path of the light beam.

The optical-filter-subdivision layer may include materials, which are layered in a small number of layering on one side of the front side and the rear side of the filter-support-seat body, on the front side and the rear side of the filter-support-seat body.

The optical-filter-subdivision layer may include silicon dioxide ($SiO_2$) and titanium oxide ($TiO_2$ or $Ti_3O_5$), silicon dioxide ($SiO_2$) and tantalum oxide ($Ta_2O_5$), or silicon dioxide ($SiO_2$) and niobium pentoxide ($Nb_2O_5$), which are alternately and repeatedly layered, as the layered materials.

The optical-filter-subdivision layer may be formed by alternately and repeatedly layering silicon dioxide ($SiO_2$) and titanium oxide ($TiO_2$ or $Ti_3O_5$), silicon dioxide ($SiO_2$) and tantalum oxide ($Ta_2O_5$), or silicon dioxide ($SiO_2$) and niobium pentoxide ($Nb_2O_5$) on one side of the filter-support-seat body, and by alternately and repeatedly layering silicon dioxide ($SiO_2$) and titanium oxide ($TiO_2$ or $Ti_3O_5$), silicon dioxide ($SiO_2$) and tantalum oxide ($Ta_2O_5$), or silicon dioxide ($SiO_2$) and niobium pentoxide ($Nb_2O_5$) on a remaining side of the filter-support-seat body so that the layered materials positioned on one side of the filter-support-seat body are identical to or different from the layered materials on the remaining side thereof.

The optical-filter-subdivision layer may include a material in a small thickness on one side of the front side and the rear side of the filter-support-seat body and another material on the remaining side of the filter-support-seat body.

The optical-filter-subdivision layer may include a resin layer on one side of the filter-support-seat body, and silicon dioxide ($SiO_2$) and titanium oxide ($TiO_2$ or $Ti_3O_5$), silicon dioxide ($SiO_2$) and tantalum oxide ($Ta_2O_5$), or silicon dioxide ($SiO_2$) and niobium pentoxide ($Nb_2O_5$), which are alternately and repeatedly layered on the resin layer and on the remaining side of the filter-support-seat body, and the resin layer may include a near-infrared-absorbing pigment in a polymer resin containing urethane and acryl.

The optical-filter-subdivision layer may be formed by alternately and repeatedly layering silicon dioxide ($SiO_2$) and titanium oxide ($TiO_2$ or $Ti_3O_5$), silicon dioxide ($SiO_2$) and tantalum oxide ($Ta_2O_5$), or silicon dioxide ($SiO_2$) and niobium pentoxide ($Nb_2O_5$) on the resin layer, and by alternately and repeatedly layering silicon dioxide ($SiO_2$) and titanium oxide ($TiO_2$ or $Ti_3O_5$), silicon dioxide ($SiO_2$) and tantalum oxide ($Ta_2O_5$), or silicon dioxide ($SiO_2$) and niobium pentoxide ($Nb_2O_5$) on the remaining side of the filter-support-seat body to secure a layering thickness that is smaller than the layering thickness on the resin layer and to layer materials that are identical to the materials layered on the resin layer.

The optical-filter-subdivision layer may allow the dummy-internal-projection side of the dummy region to be exposed to the outside of the filter-support-seat body.

A method of manufacturing a near-infrared filter according to the present invention includes a first step of preparing a glass substrate, a second step of forming a plurality of photoresist patterns in a two-dimensional arrangement on a front side and a rear side of the glass substrate, a third step of forming a prospective filter pedestal for defining a prospective dummy region around an individual photoresist pattern on at least one side of the front side and the rear side of the glass substrate by forming a plurality of blow holes for forming cracks using perforation around the individual photoresist pattern in the glass substrate, a fourth step of performing a wet etching process of the prospective dummy region together with the plurality of blow holes for forming cracks on the perforated glass substrate, so that the prospective dummy region is changed into a dummy-defining region and a chamfered side is formed in the dummy-defining region, a fifth step of removing the plurality of photoresist patterns from the etched glass substrate so that a filter-support intermediate defined by the plurality of etched blow holes for forming cracks is formed, a sixth step of subjecting the etched glass substrate to a chemical reinforcing process so that the filter-support intermediate is changed into a filter-support-seat body, and a seventh step of forming an optical filter layer covering the reinforced glass substrate so that near-infrared rays pass to the filter-support-seat body therethrough or are blocked thereby with respect to the filter-support-seat body.

The forming the plurality of blow holes for forming cracks using the perforation in the glass substrate may include repeatedly radiating a beam spot of a laser beam on the glass substrate so that an individual blow hole for forming cracks corresponds to the single beam spot, and forming cracks between the plurality of blow holes for forming cracks along a circumference of the individual photoresist pattern during radiation of the laser beam.

The prospective filter pedestal may include the prospective dummy region together with a region occupied by the individual photoresist pattern on the perforated glass substrate.

The performing the wet etching process on the perforated glass substrate may include immersing the perforated glass substrate in a wet etching bath containing hydrofluoric acid (HF) maintained at 25 to 30° C., enabling the hydrofluoric acid to permeate the plurality of blow holes for forming cracks in the perforated glass substrate using the individual photoresist pattern as an etching mask, and forming the dummy-defining region by selective etching of the prospective dummy region through cracks between the plurality of blow holes for forming cracks together with the plurality of blow holes for forming cracks using the hydrofluoric acid.

The chamfered side may have a horizontal length of 50 to 200 μm, based on a side wall of the individual photoresist pattern, when the above side is projected on a bottom surface of a right triangle, and may also have a vertical length of 2 to 10 μm, based on a bottom surface of the individual photoresist pattern, when the above side is projected on the height of the right triangle in view of a cross-section of the right triangle so that the individual photoresist pattern is gradually lowered toward the plurality of etched blow holes for forming cracks from the side wall thereof to thus be tapered.

The filter-support intermediate may include the dummy-defining region and a preliminary cell region surrounded by the dummy-defining region in the etched glass substrate.

The subjecting the etched glass substrate to the chemical reinforcing process may include immersing the etched glass substrate in a molten-metal bath containing potassium nitrate ($KNO_3$) maintained at 350 to 450° C., performing counter diffusion of alkali ions ($Na^+$) of the etched glass substrate and alkali ions ($K^+$) of the potassium nitrate ($KNO_3$) during a chemical reaction of the potassium nitrate ($KNO_3$) and the etched glass substrate in the molten-metal bath so that the alkali ions ($K^+$) permeate the surface of the etched glass substrate, and cooling the etched glass substrate to thus form a reinforcing layer on the surface of the etched glass substrate so that compressive stress occurs on the surface of the etched glass substrate.

During a chemical reinforcing process, a filter-support-seat body may be formed from the filter-support intermediate by including a reinforcing layer in surfaces of the dummy-defining region and the preliminary cell region to change the dummy-defining region and the preliminary cell region into a dummy region and a cell region.

The optical filter layer may be formed by alternately and repeatedly layering silicon dioxide ($SiO_2$) and titanium oxide ($TiO_2$ or $Ti_3O_5$), silicon dioxide ($SiO_2$) and tantalum oxide ($Ta_2O_5$), or silicon dioxide ($SiO_2$) and niobium pentoxide ($Nb_2O_5$) on one side of a front side and a rear side of the reinforced glass substrate, and by alternately and repeatedly layering silicon dioxide ($SiO_2$) and titanium oxide ($TiO_2$ or $Ti_3O_5$), silicon dioxide ($SiO_2$) and tantalum oxide ($Ta_2O_5$), or silicon dioxide ($SiO_2$) and niobium pentoxide ($Nb_2O_5$) on a remaining side of the reinforced glass substrate so that materials are layered on the remaining side of the reinforced glass substrate in a number of layers that is smaller than a number of layers on one side of the reinforced glass substrate, and the materials layered on the remaining side of the reinforced glass substrate are identical to or different from the materials layered on one side of the reinforced glass substrate.

The optical filter layer may include a resin layer on one side of the front side and the rear side of the reinforced glass substrate, silicon dioxide ($SiO_2$) and titanium oxide ($TiO_2$ or $Ti_3O_5$), silicon dioxide ($SiO_2$) and tantalum oxide ($Ta_2O_5$), or silicon dioxide ($SiO_2$) and niobium pentoxide ($Nb_2O_5$) which are alternately and repeatedly layered on the resin layer, and silicon dioxide ($SiO_2$) and titanium oxide ($TiO_2$ or $Ti_3O_5$), silicon dioxide ($SiO_2$) and tantalum oxide ($Ta_2O_5$), or silicon dioxide ($SiO_2$) and niobium pentoxide ($Nb_2O_5$) which are alternately and repeatedly layered on the remaining side of the reinforced glass substrate to secure a layering thickness that is smaller than the layering thickness on the resin layer and to layer materials that are identical to the materials layered on the resin layer. The resin layer may include a near-infrared-absorbing pigment in a polymer resin containing urethane and acryl.

The method of manufacturing the near-infrared filter may further include a wet treatment step between the fifth step and the sixth step or between the sixth step and the seventh step. The wet treatment step may include applying a wet etching solution containing non-hydrofluoric acid or hydrofluoric acid to the etched glass substrate to thus partially etch the surface of the etched glass substrate between the fifth step and the sixth step, or applying the wet etching solution containing the non-hydrofluoric acid or the hydrofluoric acid to the reinforced glass substrate to thus partially etch the surface of the reinforced glass substrate between the sixth step and the seventh step.

The method of manufacturing the near-infrared filter may further include, after the seventh step, an eighth step of separating a plurality of filter-support-seat bodies from the reinforced glass substrate along the plurality of etched blow holes for forming cracks, and subdividing the optical filter layer on the plurality of filter-support-seat bodies using the plurality of etched blow holes for forming cracks as a crack transfer body, thus forming an optical-filter-subdivision layer on an individual filter-support-seat body.

According to the present invention, in the state in which an optical filter layer is layered on a plurality of filter-support-seat bodies held on a reinforced glass substrate by perforating the reinforced glass substrate at a constant pitch, the individual filter-support-seat body includes a quadangular pillar cell region and a dummy region surrounding the cell region, and the dummy region has a chamfered side that is slanted with respect to each other of the sides at the front side and the rear side of the individual filter-support-seat body.

Therefore, the present invention may provide an optical-filter-subdivision layer. The optical-filter-subdivision layer is formed using a plurality of blow holes for forming cracks positioned around the individual filter-support-seat body as a crack transfer body in order to subdivide the optical filter layer upon the separation of the plurality of filter-support-seat bodies from the reinforced glass substrate. The optical-filter-subdivision layer on the individual filter-support-seat body has the same area as the front side and the rear side of the individual filter-support-seat body, and does not have a tear at the edge thereof.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
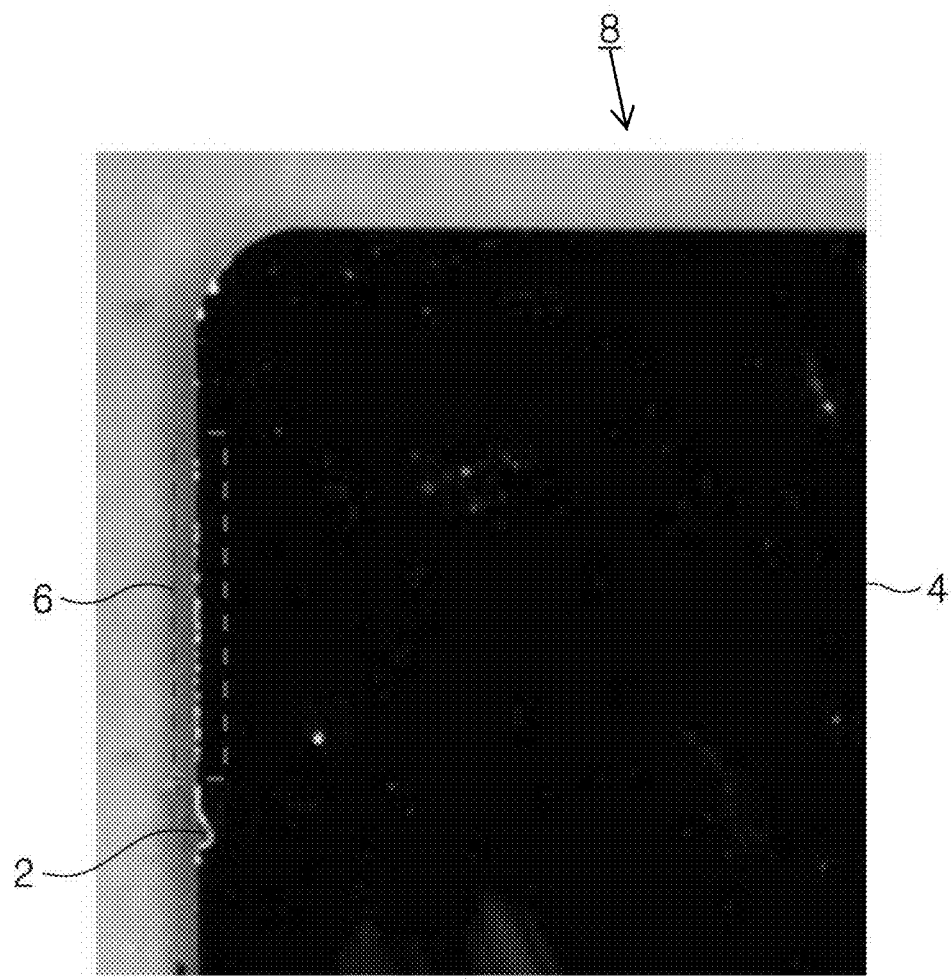
FIG. 1 is an image showing a conventional near-infrared filter.

The following detailed description of the present invention refers to the accompanying drawings, which illustrate, by way of illustration, specific embodiments in which the present invention may be practiced. These embodiments are described in sufficient detail to enable those skilled in the art to practice the present invention. It should be understood that the various embodiments of the present invention are different, but need not be mutually exclusive. For example, certain features, structures, and characteristics described herein may be implemented in other embodiments without departing from the spirit and scope of the present invention in connection with one embodiment. It is also to be understood that the position or arrangement of the individual components within each disclosed embodiment may be varied without departing from the spirit and scope of the present invention. The following detailed description is, therefore, not to be taken in a limiting sense, and the scope of the present invention is to be limited only by the appended claims, along with the full scope of equivalents covered by the claims, if properly explained. In the drawings, similar reference numerals refer to the same or similar functions throughout the several views, and lengths, areas, thicknesses, and their shapes may be exaggerated for convenience.

Hereinafter, preferred embodiment(s) of the present invention will be described in detail with reference to the accompanying drawings so that those skilled in the art can easily carry out the present invention.

Figure 2:
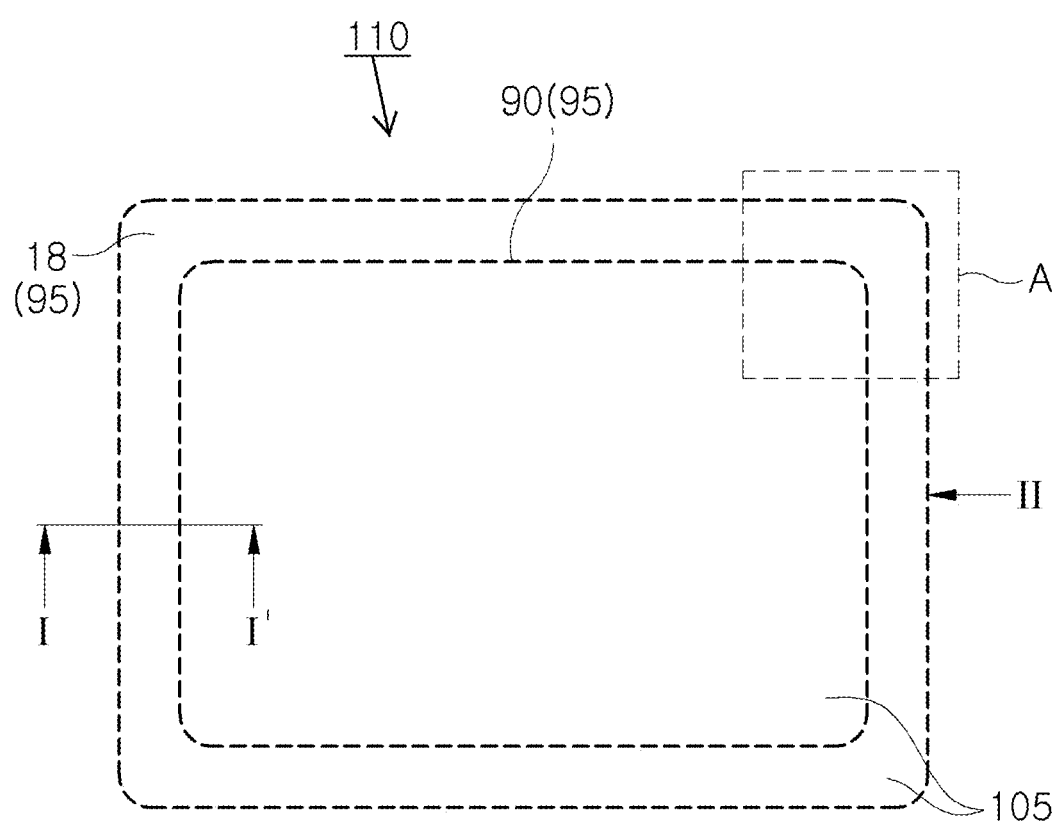
FIG. 2 is a plan view showing a near-infrared filter according to the present invention.

FIG. 2 is a plan view showing a near-infrared filter according to the present invention, and FIG. 3 is a partial cross-sectional view showing the near-infrared filter taken along the cutting line I-I' of FIG. 2.

Figure 4:
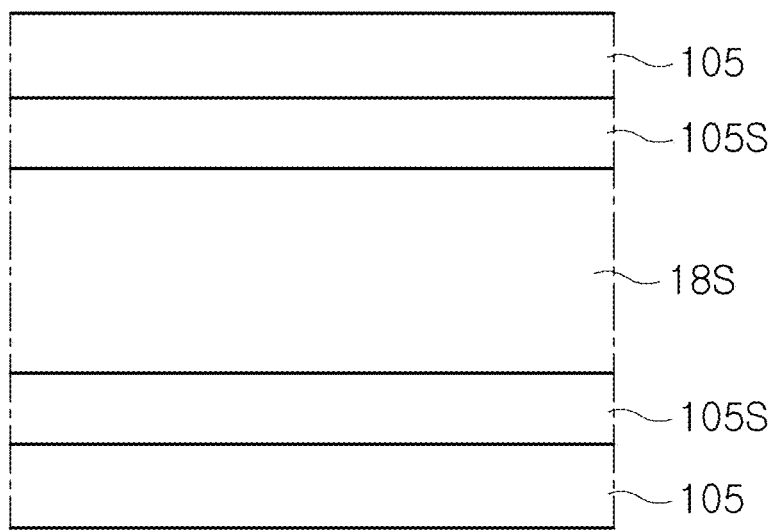
FIG. 4 is a side view of the near-infrared filter seen in the direction of arrow II in FIG. 2.
Figure 5:
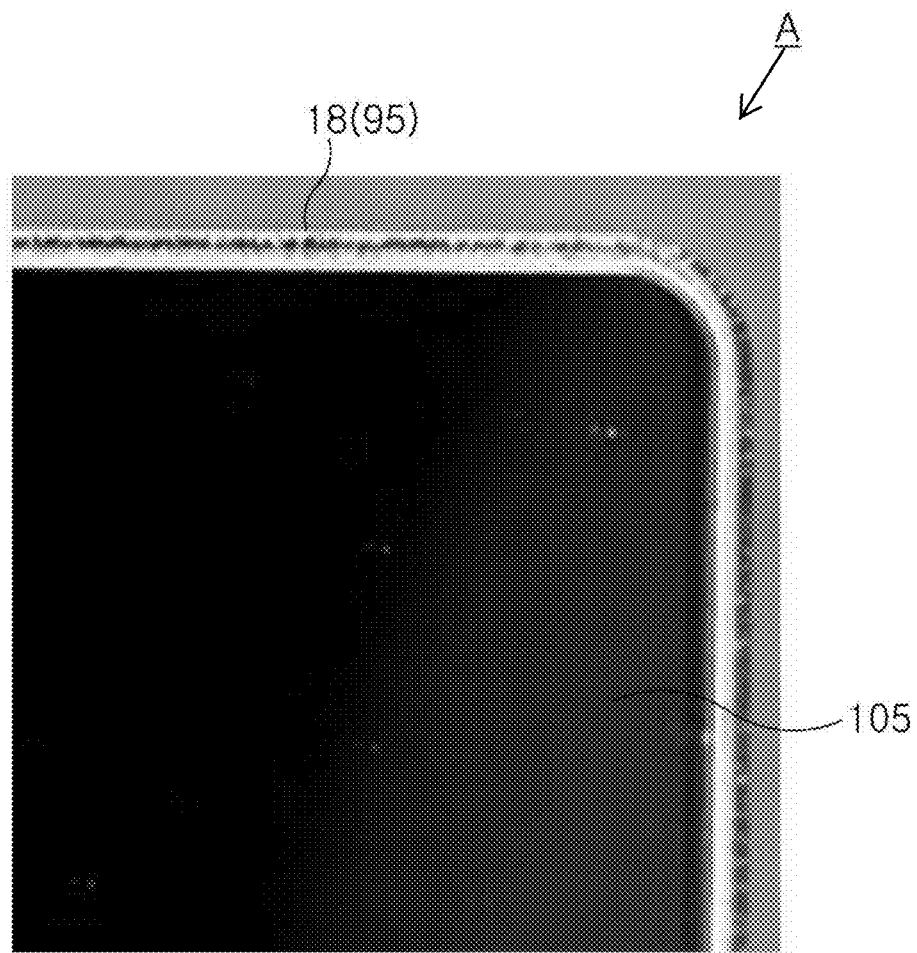
FIG. 5 is an image showing the near-infrared filter in a plan view in the indicating region A in FIG. 2.

Further, FIG. 4 is a side view of the near-infrared filter seen in the direction of arrow II in FIG. 2, and FIG. 5 is an image showing the near-infrared filter in a plan view in the indicating region A in FIG. 2.

Referring to FIGS. 2 to 5, a near-infrared filter 110 according to the present invention includes a filter-support-seat body 95 and an optical-filter-subdivision layer 105 as shown in FIGS. 2 to 4. The filter-support-seat body 95 includes soda lime glass or aluminosilicate glass. The filter-support-seat body 95 includes a quadrangular pillar cell region 90 and a dummy region 18, which surrounds the cell region 90 and is gradually reduced in size from the cell region 90.

Further, as shown in FIG. 3, the filter-support-seat body 95 further includes a reinforcing layer 80 including elements, which are different from elements in the filter-support-seat body 95, along the surface of the cell region 90 and the surface of the dummy region 18 beneath the optical-filter-subdivision layer 105. In more detail, the filter-support-seat body 95 is subjected to reinforcing treatment to have compressive stress on the surface thereof using counter diffusion of alkali ions ($Na^+$) of the filter-support-seat body and alkali ions ($K^+$) of potassium nitrate ($KNO_3$) in a molten-metal bath (not shown in the drawing) containing the potassium nitrate ($KNO_3$).

Figure 3A:
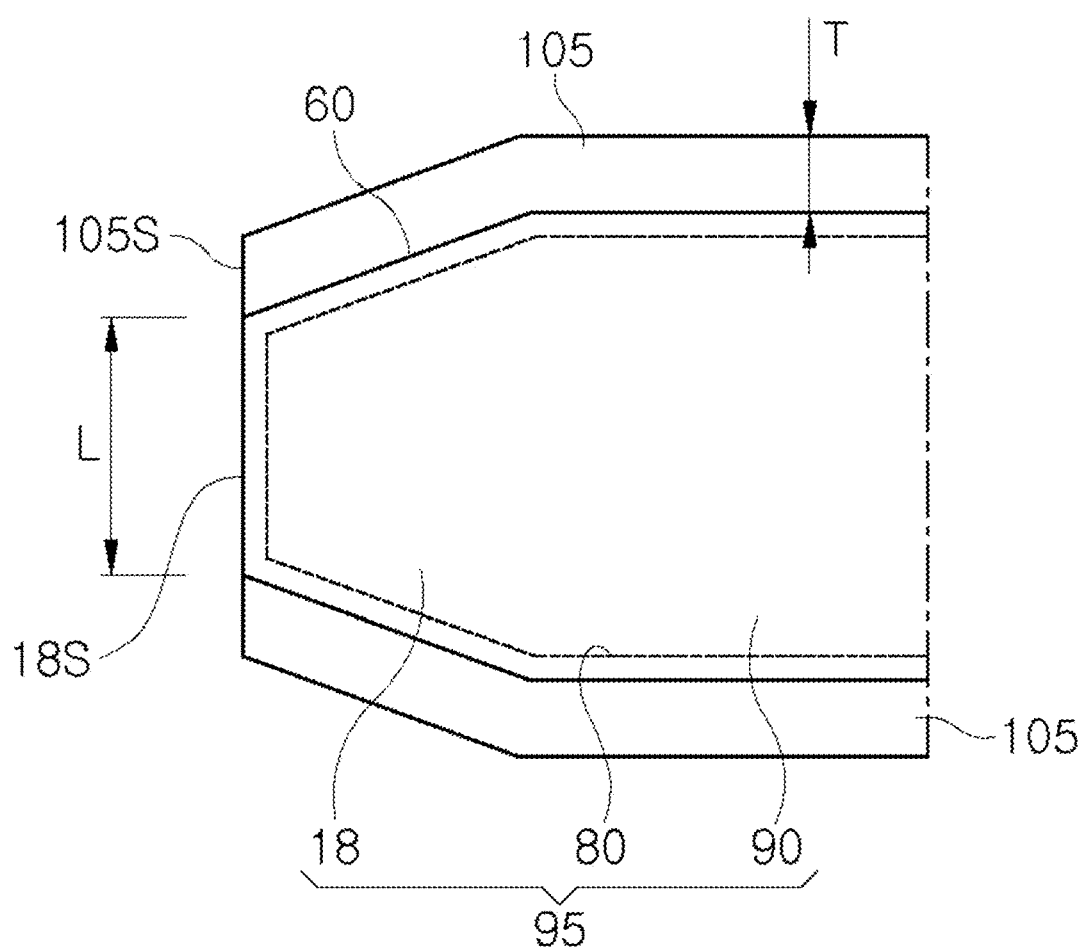
FIGS. 3A and 3B is a partial cross-sectional view showing the near-infrared filter taken along the cutting line I-I' of FIG. 2.
Figure 3B:
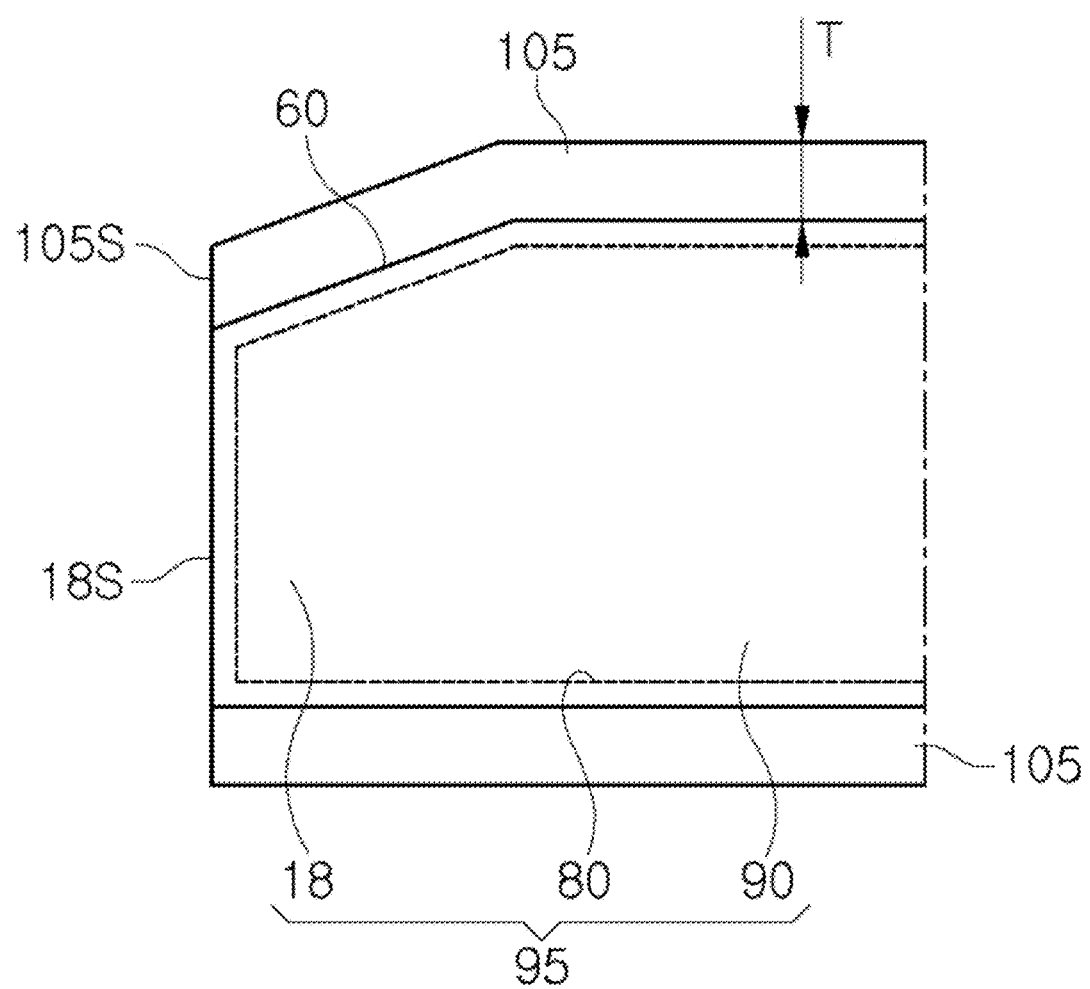

As shown in FIGS. 3A and 3B, the filter-support-seat body 95 is tapered toward a dummy-internal-projection side 18S from the cell region 90 at a chamfered side 60 of the dummy region 18. In more detail, the chamfered side 60 of the dummy region 18, which is slanted obliquely, is formed in at least one of the front side and the rear side of the filter-support-seat body 95 based on the path of a light beam which is incident on the front side and penetrates the rear side in the filter-support-seat body 95.

That is, the chamfered sides 60 of the dummy region 18 are positioned on the front side and the rear side of the filter-support-seat body 95 in FIG. 3A, and are positioned only on the front side of the filter-support-seat body 95 in FIG. 3B. The chamfered side 60 may be positioned only on the rear side of the filter-support-seat body 95 instead of the front side thereof, unlike what is shown in FIG. 3B.

The cell region 90 and the dummy region 18 have a rounded shape at all corners of the cell region 90, which diagonally face each other, in at least one of the front side and the rear side of the filter-support-seat body 95, as shown in FIG. 1. The length L of the dummy-internal-projection side 18S is larger than the thickness T of the optical-filter-subdivision layer 105, based on the path of the light beam, as in FIG. 3.

Meanwhile, the optical-filter-subdivision layer 105 covers the cell region 90 and the dummy region 18 at the front side and the rear side of the filter-support-seat body 95, as shown in FIGS. 3 and 4. The optical-filter-subdivision layer 105 allows near-infrared rays to pass therethrough or to be blocked in regions corresponding to the cell region 90 and the dummy region 18, and has a smooth side 105S with respect to the dummy-internal-projection side 18S in contact with the outside of the filter-support-seat body 95, in the dummy region 18, as shown in FIG. 3.

The smooth side 105S of the optical-filter-subdivision layer 105 prevents the tear 6 shown in FIG. 1 from being formed at the edge of the optical-filter-subdivision layer 105, as shown in FIG. 5. In an embodiment of the present invention, in order to realize a near-infrared-pass filter together with the filter-support-seat body 95, the optical-filter-subdivision layer 105 includes materials, which are layered in a small number of layering on one side of the front side and the rear side of the filter-support-seat body 95, on the front side and the rear side of the filter-support-seat body 95.

The optical-filter-subdivision layer 105 includes silicon dioxide ($SiO_2$) and titanium oxide ($TiO_2$ or $Ti_3O_5$), silicon dioxide ($SiO_2$) and tantalum oxide ($Ta_2O_5$), or silicon dioxide ($SiO_2$) and niobium pentoxide ($Nb_2O_5$), which are alternately and repeatedly layered, as the layered materials. In more detail, the optical-filter-subdivision layer 105 is formed by alternately and repeatedly layering silicon dioxide ($SiO_2$) and titanium oxide ($TiO_2$ or $Ti_3O_5$), silicon dioxide ($SiO_2$) and tantalum oxide ($Ta_2O_5$), or silicon dioxide ($SiO_2$) and niobium pentoxide ($Nb_2O_5$) on one side of the filter-support-seat body 95, and by alternately and repeatedly layering silicon dioxide ($SiO_2$) and titanium oxide ($TiO_2$ or $Ti_3O_5$), silicon dioxide ($SiO_2$) and tantalum oxide ($Ta_2O_5$), or silicon dioxide ($SiO_2$) and niobium pentoxide ($Nb_2O_5$) on the remaining side of the filter-support-seat body 95 so that the layered materials positioned on one side of the filter-support-seat body are identical to or different from the layered materials on the remaining side thereof.

Similarly, in another embodiment of the present invention, in order to realize a near-infrared cutoff filter together with the filter-support-seat body 95, the optical-filter-subdivision layer 105 may include a material having a small thickness on one side of the front side and the rear side of the filter-support-seat body 95 and another material on the remaining side of the filter-support-seat body 95. The optical-filter-subdivision layer 105 includes a resin layer on one side of the filter-support-seat body 95, and silicon dioxide ($SiO_2$) and titanium oxide ($TiO_2$ or $Ti_3O_5$), silicon dioxide ($SiO_2$) and tantalum oxide ($Ta_2O_5$), or silicon dioxide ($SiO_2$) and niobium pentoxide ($Nb_2O_5$), which are alternately and repeatedly layered on the resin layer and on the remaining side of the filter-support-seat body 95.

The resin layer includes a near-infrared-absorbing pigment in a polymer resin containing urethane and acryl. In more detail, the optical-filter-subdivision layer 105 is formed by alternately and repeatedly layering silicon dioxide ($SiO_2$) and titanium oxide ($TiO_2$ or $Ti_3O_5$), silicon dioxide ($SiO_2$) and tantalum oxide ($Ta_2O_5$), or silicon dioxide ($SiO_2$) and niobium pentoxide ($Nb_2O_5$) on the resin layer, and by alternately and repeatedly layering silicon dioxide ($SiO_2$) and titanium oxide ($TiO_2$ or $Ti_3O_5$), silicon dioxide ($SiO_2$) and tantalum oxide ($Ta_2O_5$), or silicon dioxide ($SiO_2$) and niobium pentoxide ($Nb_2O_5$) on the remaining side of the filter-support-seat body 95 to secure a layering thickness that is smaller than the layering thickness on the resin layer and to layer materials that are identical to the materials layered on the resin layer.

The optical-filter-subdivision layer 105 allows the dummy-internal-projection side 18S of the dummy region 18 to be exposed to the outside of the filter-support-seat body 95, as shown in FIGS. 3A, 3B, and 4. The smooth side 105S of the optical-filter-subdivision layer 105 is positioned on the same straight line as the dummy-internal-projection side 18S of the dummy region 18, as shown in FIGS. 3 and 5.

Next, a method of manufacturing the near-infrared filter according to the present invention will be described in detail with reference to FIGS. 6 to 17.

Figure 8:
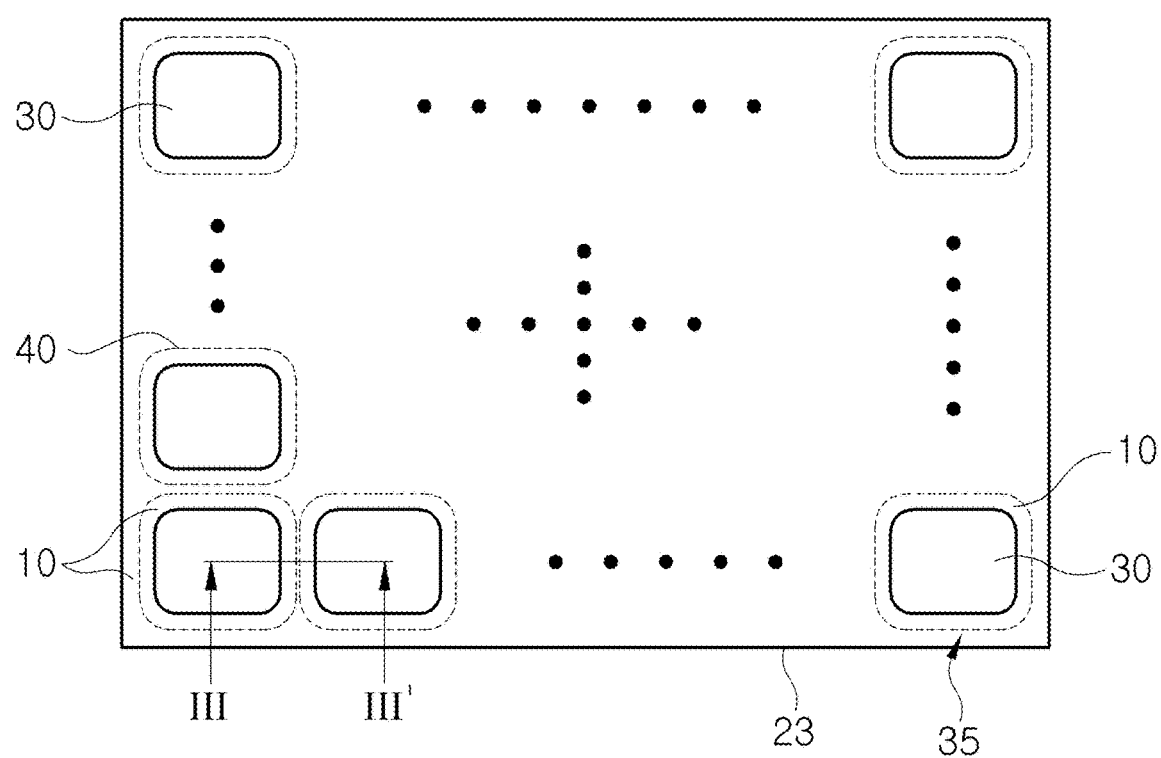
Figure 9:
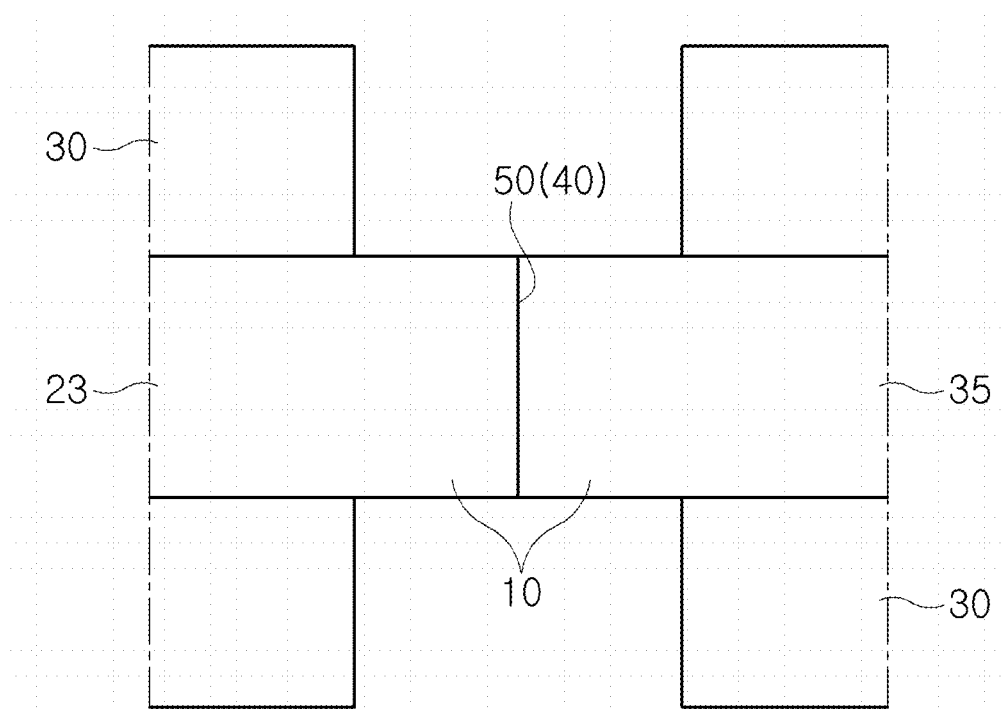
Figure 10:
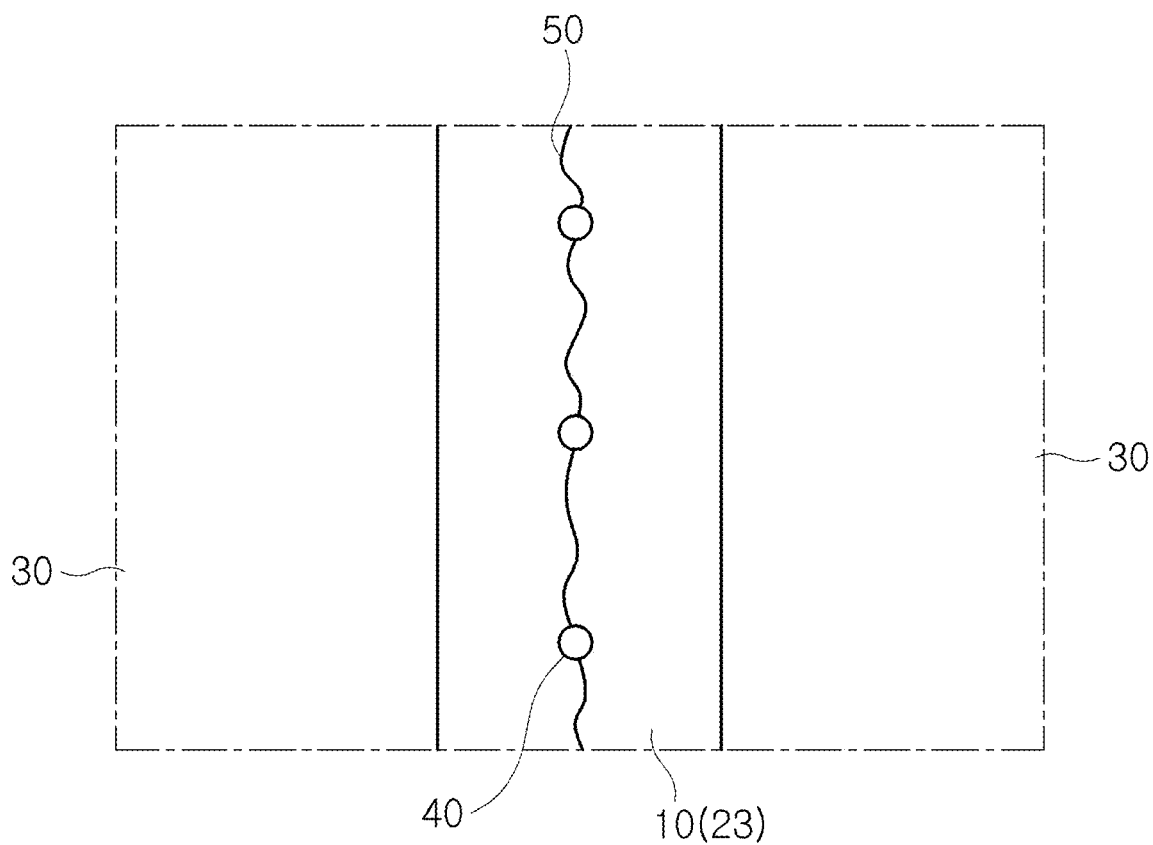

FIGS. 6 to 17 are schematic views for showing the method of manufacturing the near-infrared filter of FIG. 1. FIG. 7, 9, 12, 15, or 17 is a partial cross-sectional view, which illustrates structures separately formed for each drawing and which is taken along the cutting line III-III' in FIG. 6, 8, 11, 14, or 16. Further, FIG. 10 is a schematic view showing the shape of the structure in a plan view around the cutting line III-III' in FIG. 8.

Further, FIG. 6, 8, 11, 14, or 16 do not show the deformed shape at each process step because the deformed shape of the edge of a glass substrate 20, a perforated glass substrate 23, an etched glass substrate 26, or a reinforced glass substrate 29 is not of interest.

Figure 6:
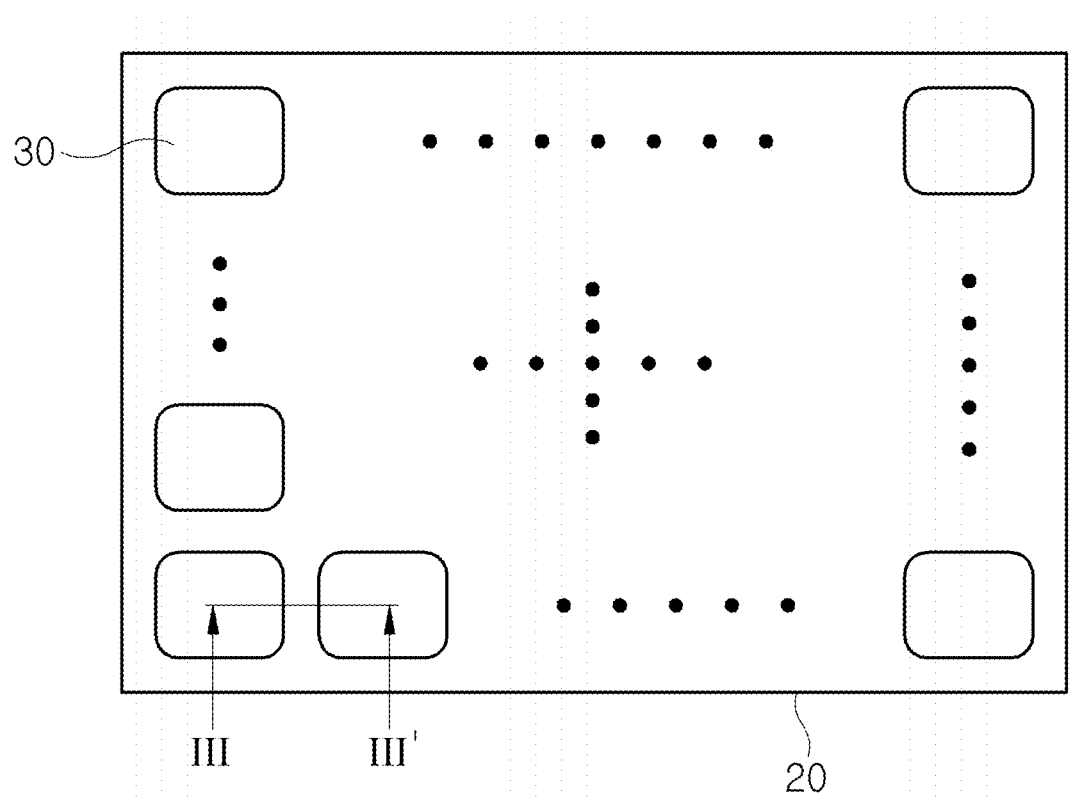
FIGS. 6 to 17 are schematic views for showing a method of manufacturing the near-infrared filter of FIG. 1.

Referring to FIGS. 6 to 17, the method of manufacturing the near-infrared filter according to the present invention may be described on the basis of FIG. 3A in order to facilitate understanding of the present invention. To this end, the method of manufacturing the near-infrared filter according to the present invention may include a first step of preparing a glass substrate 20, as shown in FIG. 6.

Figure 7:
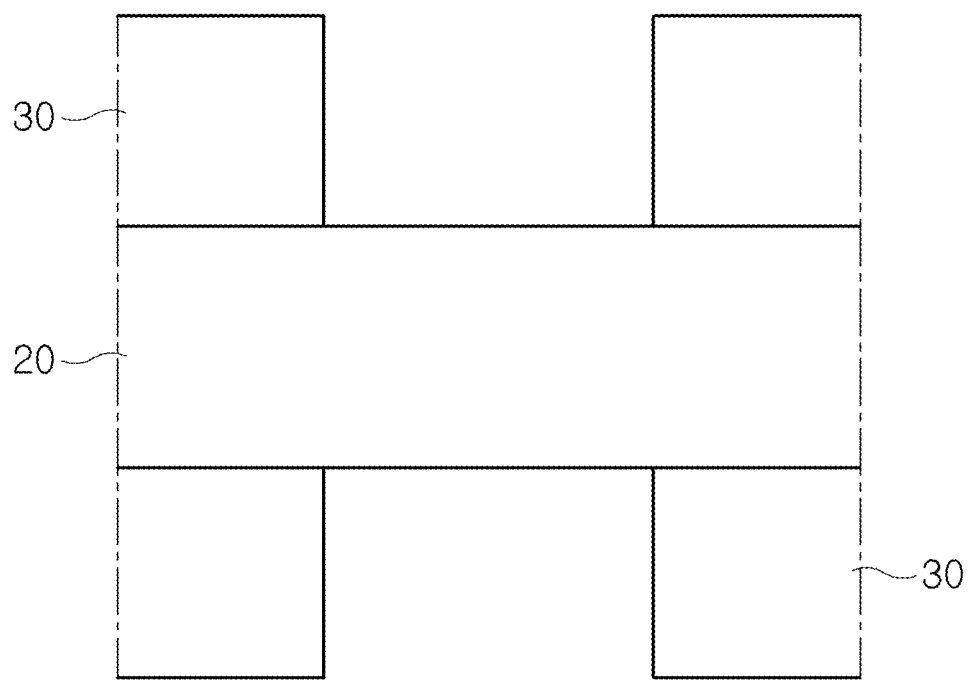

The glass substrate 20 is shown in detail in the filter-support-seat body 95 of FIGS. 1 to 5. Further, the method of manufacturing the near-infrared filter may include a second step of forming a plurality of photoresist patterns 30 in a two-dimensional arrangement on the front side and the rear side of the glass substrate 20, as shown in FIGS. 6 and 7.

Further, the method of manufacturing the near-infrared filter may include a third step of forming a prospective filter pedestal 35 for defining a prospective dummy region 10 around an individual photoresist pattern 30 by forming a plurality of blow holes 40 for forming cracks using perforation around the individual photoresist pattern 30 on the glass substrate 20, as shown in FIGS. 8 to 10.

To be more specific, the forming the plurality of blow holes 40 for forming cracks using the perforation on the glass substrate 20 may include repeatedly radiating a beam spot of a laser beam (not shown in the drawing) on the glass substrate 20 so that the individual blow hole 40 for forming cracks corresponds to the single beam spot, and forming cracks 50 of FIG. 10 between the plurality of blow holes 40 for forming cracks along the circumference of the individual photoresist pattern 30 during the radiation of the laser beam.

Figure 11:
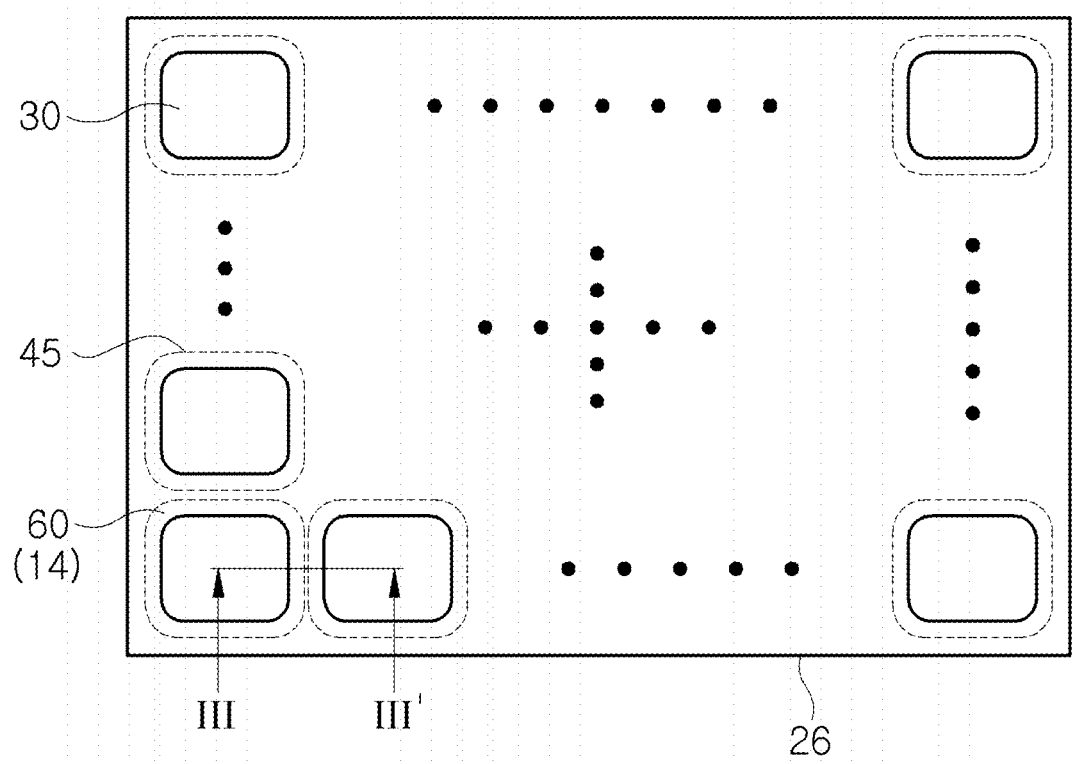

The prospective filter pedestal 35 includes the prospective dummy region 10 together with the region occupied by the individual photoresist pattern 30 on the front side and the rear side of the perforated glass substrate 23. Further, the method of manufacturing the near-infrared filter may include a fourth step of performing a wet etching process of the prospective dummy region 10 together with the plurality of blow holes 40 for forming cracks on the perforated glass substrate 23, so that the prospective dummy region 10 is changed into a dummy-defining region 14 and a chamfered side 60 is famed in the dummy-defining region 14, as shown in FIGS. 11 and 12.

The performing the wet etching process on the perforated glass substrate 23 includes immersing the perforated glass substrate 23 in a wet etching bath containing hydrofluoric acid (HF) maintained at 25 to 30° C., enabling the hydrofluoric acid to permeate the plurality of blow holes 40 for forming cracks in the perforated glass substrate 23 using the individual photoresist pattern 30 as an etching mask, and forming the dummy-defining region 14 by selective etching of the prospective dummy region 10 through cracks 50 of FIG. 10 between the plurality of blow holes 40 for forming cracks together with the plurality of blow holes 40 for forming cracks using the hydrofluoric acid.

The selective etching of the prospective dummy region 10 may be performed so that cracks 55 formed by etching between a plurality of etched blow holes 45 for forming cracks are formed together with the plurality of etched blow holes 45 for forming cracks in the etched glass substrate 26.

Figure 12:
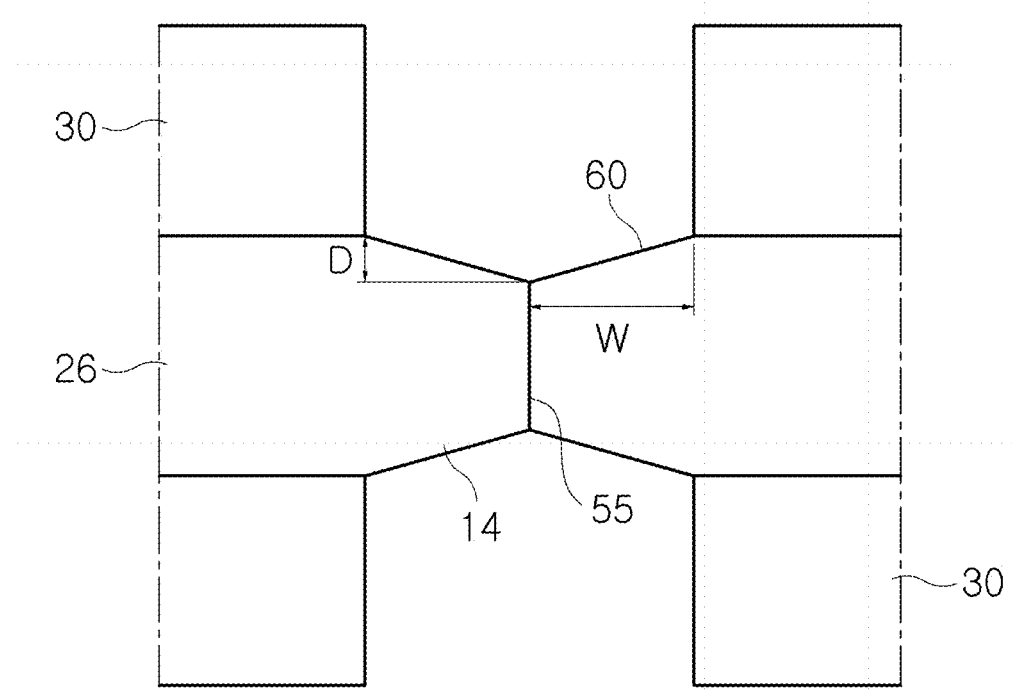

The chamfered side 60 has a horizontal length W of 50 to 200 μm, based on a side wall of the individual photoresist pattern 30, when the chamfered side 60 is projected on a bottom surface of a right triangle and also has a vertical length D of 2 to 10 μm, based on a bottom surface of the individual photoresist pattern 30, when the chamfered side 60 is projected on a height of the right triangle in view of a cross-section of the right triangle shown in FIG. 12 so that the individual photoresist pattern 30 is gradually lowered toward the plurality of etched blow holes 45 for forming cracks from the side wall thereof to thus be tapered.

Figure 13:
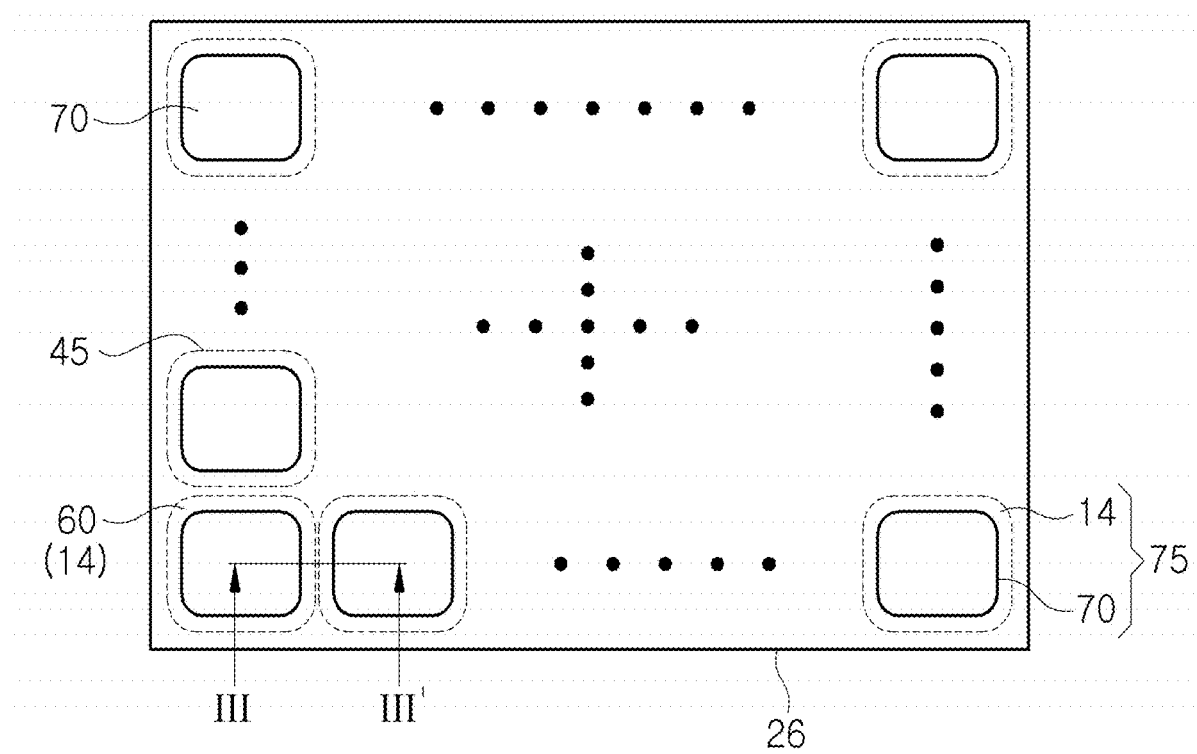
Figure 14:
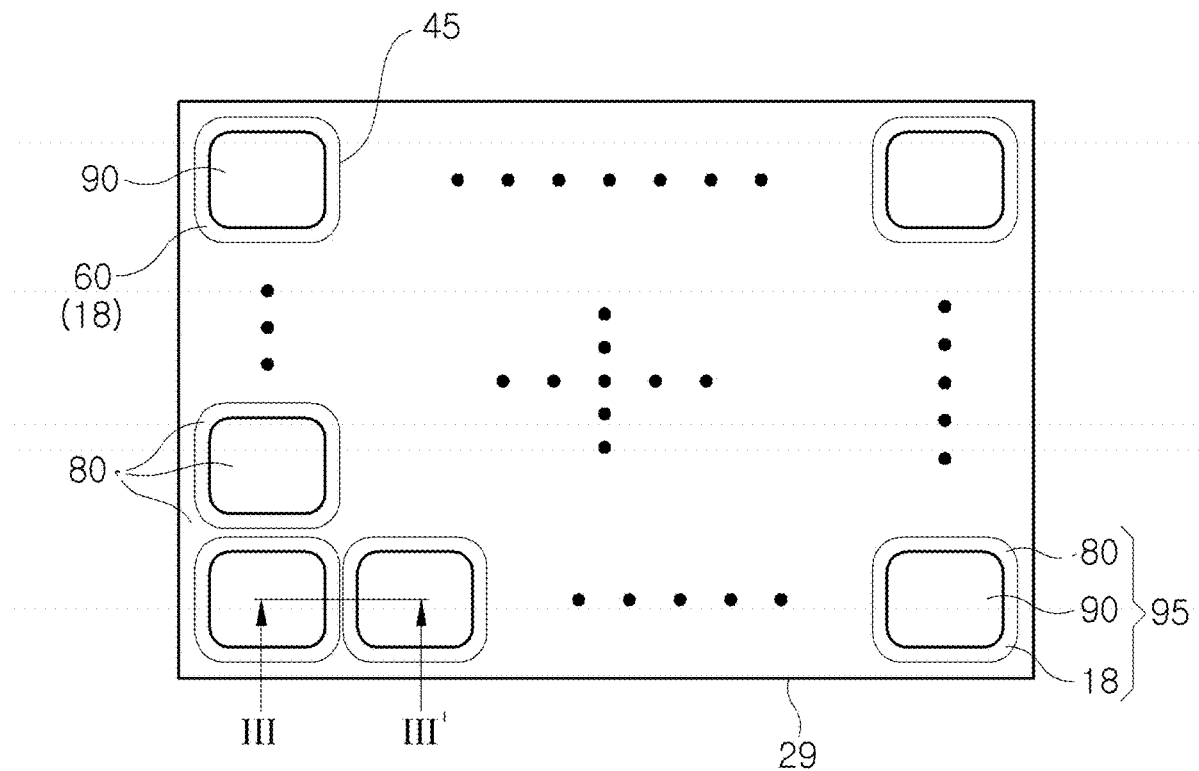
Figure 15:
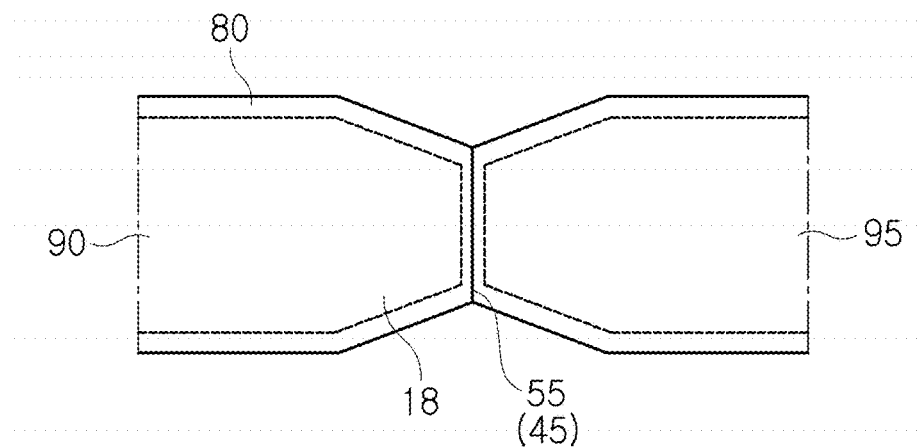

Next, the method of manufacturing the near-infrared filter may include a fifth step of removing a plurality of photoresist patterns 30 from the etched glass substrate 26 so that a filter-support intermediate 75 defined by the plurality of etched blow holes 45 for forming cracks is formed, as shown in FIG. 13. The filter-support intermediate 75 may include the dummy-defining region 14 and a preliminary cell region 70 surrounded by the dummy-defining region 14 in the etched glass substrate 26. Subsequently, the method of manufacturing the near-infrared filter may include a sixth step of subjecting the etched glass substrate 26 to a chemical reinforcing process so that the filter-support intermediate 75 is changed into the filter-support-seat body 95, as shown in FIGS. 14 and 15.

The subjecting the etched glass substrate 26 to the chemical reinforcing process may include immersing the etched glass substrate 26 in a molten-metal bath containing potassium nitrate ($KNO_3$) maintained at 350 to 450° C., performing counter diffusion of alkali ions ($Na^+$) of the etched glass substrate 26 and alkali ions ($K^+$) of the potassium nitrate ($KNO_3$) during a chemical reaction of the potassium nitrate ($KNO_3$) and the etched glass substrate 26 in the molten-metal bath so that the alkali ions ($K^+$) permeate the surface of the etched glass substrate 26, and cooling the etched glass substrate 26 to thus form a reinforcing layer 80 on the surface of the etched glass substrate 26 so that compressive stress occurs on the surface of the etched glass substrate 26.

Figure 16:
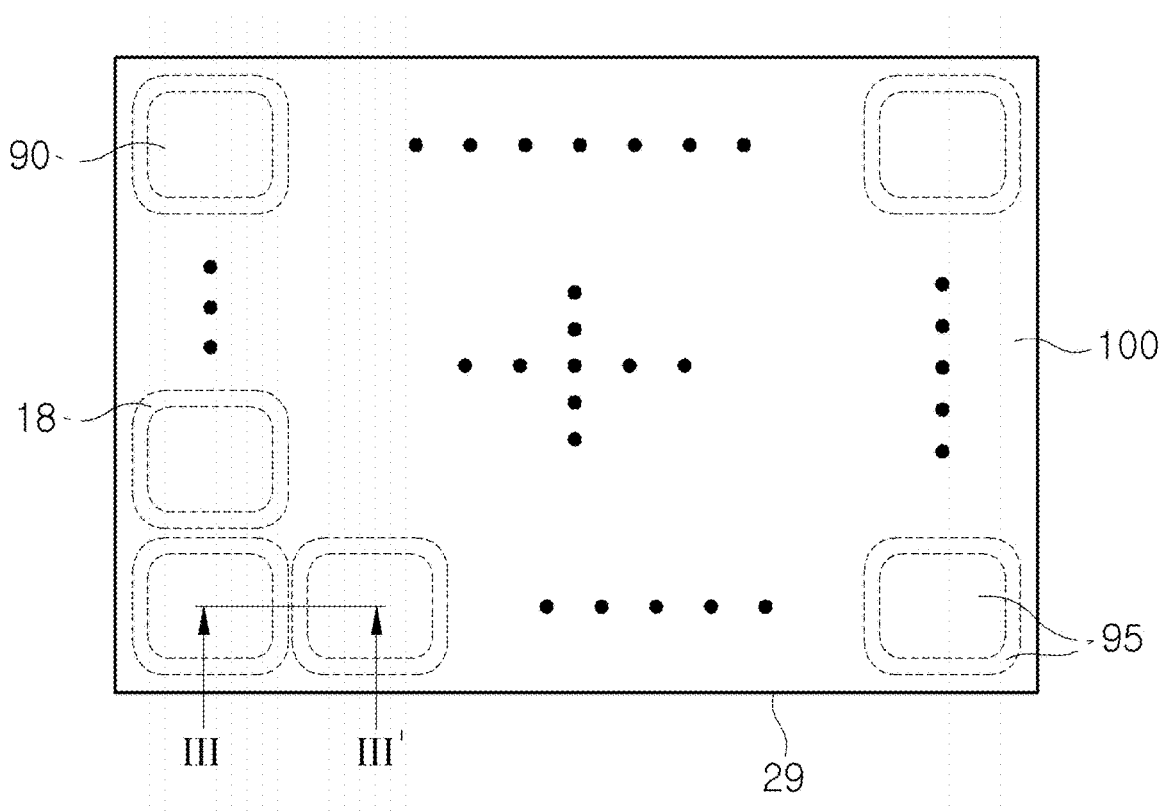
Figure 17:
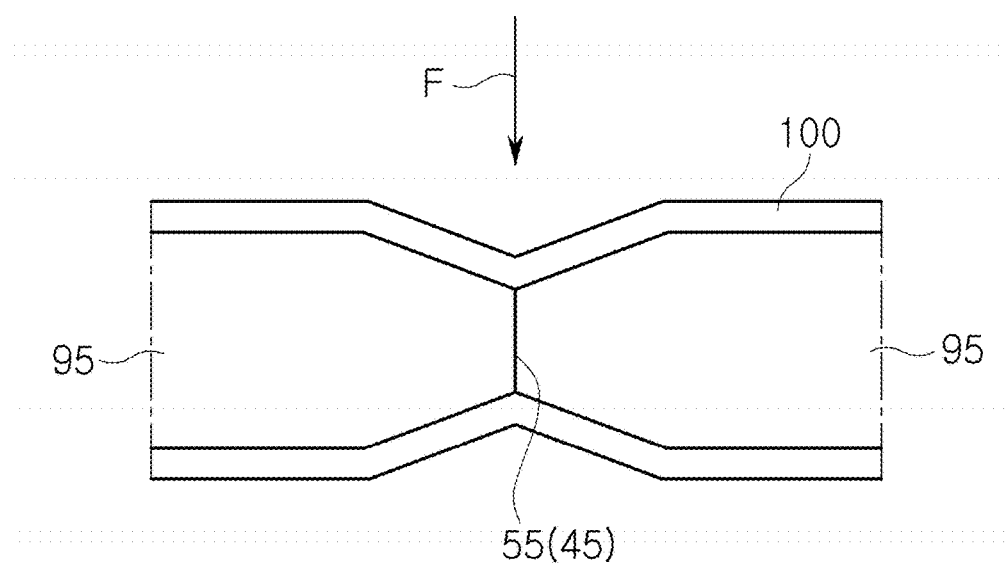

During the chemical reinforcing process, the filter-support-seat body 95 is famed from the filter-support intermediate 75 by including the reinforcing layer 80 in surfaces of the dummy-defining region 14 and the preliminary cell region 70 to change the dummy-defining region 14 and the preliminary cell region 70 into a dummy region 18 and a cell region 90. Subsequently, the method of manufacturing the near-infrared filter may include a seventh step of forming an optical filter layer 100 covering the reinforced glass substrate 29 so that near-infrared rays pass to the filter-support-seat body 95 therethrough or are blocked thereby with respect to the filter-support-seat body 95, as shown in FIGS. 16 and 17.

In order to form the near-infrared-pass filter disclosed in FIGS. 1 to 5, the optical filter layer 100 may be formed by alternately and repeatedly layering silicon dioxide ($SiO_2$) and titanium oxide ($TiO_2$ or $Ti_3O_5$), silicon dioxide ($SiO_2$) and tantalum oxide ($Ta_2O_5$), or silicon dioxide ($SiO_2$) and niobium pentoxide ($Nb_2O_5$) on one side of the front side and the rear side of the reinforced glass substrate 29, and by alternately and repeatedly layering silicon dioxide ($SiO_2$) and titanium oxide ($TiO_2$ or $Ti_3O_5$), silicon dioxide ($SiO_2$)

and tantalum oxide ($Ta_2O_5$), or silicon dioxide ($SiO_2$) and niobium pentoxide ($Nb_2O_5$) on the remaining side of the reinforced glass substrate 29 so that materials are layered on the remaining side of the reinforced glass substrate in a number of layers that is smaller than the number of layers on one side of the reinforced glass substrate, and the materials layered on the remaining side of the reinforced glass substrate are identical to or different from the materials layered on one side of the reinforced glass substrate.

Similarly, in order to form the near-infrared cutoff filter disclosed in FIGS. 1 to 5, the optical filter layer 100 may include a resin layer on one side of the front side and the rear side of the reinforced glass substrate 29; silicon dioxide ($SiO_2$) and titanium oxide ($TiO_2$ or $Ti_3O_5$), silicon dioxide ($SiO_2$) and tantalum oxide ($Ta_2O_5$), or silicon dioxide ($SiO_2$) and niobium pentoxide ($Nb_2O_5$), which are alternately and repeatedly layered on the resin layer; and silicon dioxide ($SiO_2$) and titanium oxide ($TiO_2$ or $Ti_3O_5$), silicon dioxide ($SiO_2$) and tantalum oxide ($Ta_2O_5$), or silicon dioxide ($SiO_2$) and niobium pentoxide ($Nb_2O_5$), which are alternately and repeatedly layered on the remaining side of the reinforced glass substrate 29 to secure a layering thickness that is smaller than the layering thickness on the resin layer and to layer materials that are identical to the materials layered on the resin layer. The resin layer may include a near-infrared-absorbing pigment in a polymer resin containing urethane and acryl.

Meanwhile, the method of manufacturing the near-infrared filter may further include a wet treatment step between the fifth step and the sixth step or between the sixth step and the seventh step. The wet treatment step may further include applying a wet etching solution containing non-hydrofluoric acid or hydrofluoric acid to the etched glass substrate 26 to thus partially etch the surface of the etched glass substrate 26 between the fifth step and the sixth step, or applying the wet etching solution containing the non-hydrofluoric acid or the hydrofluoric acid to the reinforced glass substrate 29 to thus partially etch the surface of the reinforced glass substrate 29 between the sixth step and the seventh step.

The wet treatment step may be performed so that lattice defects of the glass substrate 20 before processing are removed from the surface of the glass substrate 20 or lattice defects of the glass substrate 20 after processing, which are exposed on the surface of the perforated glass substrate 23, the etched glass substrate 26, or the reinforced glass substrate 29, are removed during each step of the first to seventh steps in the method of manufacturing the near-infrared filter.

Subsequently, the method of manufacturing the near-infrared filter may further include, after the seventh step, an eighth step of, during application of external force F to the reinforced glass substrate 29 and the optical filter layer 100, separating a plurality of filter-support-seat bodies 95 from the reinforced glass substrate 29 along a plurality of etched blow holes 45 for forming cracks, and subdividing the optical filter layer 100 on the plurality of filter-support-seat bodies 95 using the plurality of etched blow holes 45 for forming cracks as a crack transfer body, thus forming an optical-filter-subdivision layer 105 of FIG. 1 on the individual filter-support-seat body 95.

The individual filter-support-seat body 95 and the optical-filter-subdivision layer 105 may constitute the near-infrared filter 110 of FIG. 1. The near-infrared filter 110 may be a near-infrared-pass filter or a near-infrared cutoff filter.

As a modified embodiment of the present invention, in order to realize the structure of FIG. 3B, the method of manufacturing the near-infrared filter according to the present invention may include a second step of forming a plurality of photoresist patterns 30 in a two-dimensional arrangement on the front side and the rear side of the glass substrate 20, which is similar to that in FIGS. 6 and 7. That is, the plurality of photoresist patterns 30 positioned on the front side sets, in advance, the prospective dummy region 10 of FIGS. 8 to 10.

However, the plurality of photoresist patterns 30 positioned on the rear side does not set the prospective dummy region 10 of FIGS. 8 to 10 on the glass substrate. Subsequently, in the method of manufacturing the near-infrared filter, the third to eighth steps of FIGS. 11 to 17 may be sequentially performed on the glass substrate 20.

What is claimed is:

1. A near-infrared filter comprising:
   a filter-support-seat body including a quadrangular pillar cell region and a dummy region which surrounds the cell region and which is gradually reduced in size from the cell region; and
   an optical-filter-subdivision layer covering the cell region and the dummy region on a front side and a rear side of the filter-support-seat body based on a path of a light beam which is incident on the front side and penetrates the rear side in the filter-support-seat body,
   wherein the dummy region has a chamfered side that is slanted obliquely in at least one side of the front side and the rear side of the filter-support-seat body, the optical-filter-subdivision layer allows near-infrared rays to pass therethrough or to be blocked in regions corresponding to the cell region and the dummy region, and has a smooth side with respect to a dummy-internal-projection side in contact with an outside of the filter-support-seat body in the dummy region, and the smooth side is positioned on a same straight line as the dummy-internal-projection side of the dummy region.

2. The near-infrared filter of claim 1, wherein the filter-support-seat body includes soda lime glass or aluminosilicate glass.

3. The near-infrared filter of claim 1, wherein the filter-support-seat body further includes a reinforcing layer including elements, which are different from elements in the filter-support-seat body, along a surface of the cell region, a surface of the dummy region, and the dummy-internal-projection side of the dummy region beneath the optical-filter-subdivision layer.

4. The near-infrared filter of claim 1, wherein the filter-support-seat body is subjected to reinforcing treatment to have a compressive stress on a surface thereof using counter diffusion of alkali ions ($Na^+$) of the filter-support-seat body and alkali ions ($K^+$) of potassium nitrate ($KNO_3$) in a molten-metal bath containing the potassium nitrate ($KNO_3$).

5. The near-infrared filter of claim 1, wherein the filter-support-seat body is tapered from the cell region toward the dummy-internal-projection side at the chamfered side of the dummy region.

6. The near-infrared filter of claim 1, wherein the cell region and the dummy region have a rounded shape at all corners of the cell region, which diagonally face each other, around the chamfered side of at least one side of the front side and the rear side of the filter-support-seat body.

7. The near-infrared filter of claim 1, wherein a length of the dummy-internal-projection side is larger than a thickness of the optical-filter-subdivision layer, based on the path of the light beam.

8. The near-infrared filter of claim 1, wherein the optical-filter-subdivision layer includes materials, which are layered in a small number of layering on one side of the front side and the rear side of the filter-support-seat body, on the front side and the rear side of the filter-support-seat body.

9. The near-infrared filter of claim 8, wherein the optical-filter-subdivision layer includes silicon dioxide ($SiO_2$) and titanium oxide ($TiO_2$ or $Ti_3O_5$), silicon dioxide ($SiO_2$) and tantalum oxide ($Ta_2O_5$), or silicon dioxide ($SiO_2$) and niobium pentoxide ($Nb_2O_5$), which are alternately and repeatedly layered, as the layered materials.

10. The near-infrared filter of claim 8, wherein the optical-filter-subdivision layer is famed by alternately and repeatedly layering silicon dioxide ($SiO_2$) and titanium oxide ($TiO_2$ or $Ti_3O_5$), silicon dioxide ($SiO_2$) and tantalum oxide ($Ta_2O_5$), or silicon dioxide ($SiO_2$) and niobium pentoxide ($Nb_2O_5$) on one side of the filter-support-seat body, and by alternately and repeatedly layering silicon dioxide ($SiO_2$) and titanium oxide ($TiO_2$ or $Ti_3O_5$), silicon dioxide ($SiO_2$) and tantalum oxide ($Ta_2O_5$), or silicon dioxide ($SiO_2$) and niobium pentoxide ($Nb_2O_5$) on a remaining side of the filter-support-seat body so that the layered materials positioned on one side of the filter-support-seat body are identical to or different from the layered materials on the remaining side thereof.

11. The near-infrared filter of claim 1, wherein the optical-filter-subdivision layer includes a material having a small thickness on one side of the front side and the rear side of the filter-support-seat body and another material on one side of the front side and the rear side of the filter-support-seat body.

12. The near-infrared filter of claim 11, wherein the optical-filter-subdivision layer includes a resin layer on one side of the front side and the rear side of the filter-support-seat body, and silicon dioxide ($SiO_2$) and titanium oxide ($TiO_2$ or $Ti_3O_5$), silicon dioxide ($SiO_2$) and tantalum oxide ($Ta_2O_5$), or silicon dioxide ($SiO_2$) and niobium pentoxide ($Nb_2O_5$), which are alternately and repeatedly layered on the resin layer and on a remaining side of the front side and the rear side of the filter-support-seat body, and the resin layer includes a near-infrared-absorbing pigment in a polymer resin containing urethane and acryl.

13. The near-infrared filter of claim 12, wherein the optical-filter-subdivision layer is formed by alternately and repeatedly layering silicon dioxide ($SiO_2$) and titanium oxide ($TiO_2$ or $Ti_3O_5$), silicon dioxide ($SiO_2$) and tantalum oxide ($Ta_2O_5$), or silicon dioxide ($SiO_2$) and niobium pentoxide ($Nb_2O_5$) on the resin layer, and by alternately and repeatedly layering silicon dioxide ($SiO_2$) and titanium oxide ($TiO_2$ or $Ti_3O_5$), silicon dioxide ($SiO_2$) and tantalum oxide ($Ta_2O_5$), or silicon dioxide ($SiO_2$) and niobium pentoxide ($Nb_2O_5$) on the remaining side of the front side and the rear side of the filter-support-seat body to secure a layering thickness that is smaller than a layering thickness on the resin layer and to layer materials that are identical to materials layered on the resin layer.

14. The near-infrared filter of claim 1, wherein the optical-filter-subdivision layer allows the dummy-internal-projection side of the dummy region to be exposed to the outside of the filter-support-seat body.

15. A method of manufacturing a near-infrared filter, the method comprising:
a first step of preparing a glass substrate;
a second step of forming a plurality of photoresist patterns in a two-dimensional arrangement on a front side and a rear side of the glass substrate;
a third step of forming a prospective filter pedestal for defining a prospective dummy region around an individual photoresist pattern on at least one side of the front side and the rear side of the glass substrate by forming a plurality of blow holes for forming cracks using perforation around the individual photoresist pattern in the glass substrate;
a fourth step of performing a wet etching process of the prospective dummy region together with the plurality of blow holes for forming cracks on the perforated glass substrate, so that the prospective dummy region is changed into a dummy-defining region and a chamfered side is formed in the dummy-defining region;
a fifth step of removing the plurality of photoresist patterns from the etched glass substrate so that a filter-support intermediate defined by the plurality of etched blow holes for forming cracks is formed;
a sixth step of subjecting the etched glass substrate to a chemical reinforcing process so that the filter-support intermediate is changed into a filter-support-seat body; and
a seventh step of forming an optical filter layer covering the reinforced glass substrate so that near-infrared rays pass to the filter-support-seat body therethrough or are blocked thereby with respect to the filter-support-seat body.

16. The method of claim 15, wherein the forming the plurality of blow holes for forming cracks using the perforation in the glass substrate includes repeatedly radiating a beam spot of a laser beam on the glass substrate so that an individual blow hole for forming cracks corresponds to the single beam spot, and forming cracks between the plurality of blow holes for forming cracks along a circumference of the individual photoresist pattern during radiation of the laser beam.

17. The method of claim 15, wherein the prospective filter pedestal includes the prospective dummy region together with a region occupied by the individual photoresist pattern on the perforated glass substrate.

18. The method of claim 15, wherein the performing the wet etching process on the perforated glass substrate includes immersing the perforated glass substrate in a wet etching bath containing hydrofluoric acid (HF) maintained at 25 to 30° C., enabling the hydrofluoric acid to permeate the plurality of blow holes for forming cracks in the perforated glass substrate using the individual photoresist pattern as an etching mask, and forming the dummy-defining region by selective etching of the prospective dummy region through cracks between the plurality of blow holes for forming cracks together with the plurality of blow holes for forming cracks using the hydrofluoric acid.

19. The method of claim 15, wherein the chamfered side has a horizontal length of 50 to 200 μm, based on a side wall of the individual photoresist pattern, when the chamfered side is projected on a bottom surface of a right triangle, and also has a vertical length of 2 to 10 μm, based on a bottom surface of the individual photoresist pattern, when the chamfered side is projected on a height of the right triangle in view of a cross-section of the right triangle so that the individual photoresist pattern is gradually lowered toward the plurality of etched blow holes for forming cracks from the side wall thereof to thus be tapered.

20. The method of claim 15, wherein the filter-support intermediate includes the dummy-defining region and a preliminary cell region surrounded by the dummy-defining region in the etched glass substrate.

21. The method of claim 15, wherein the subjecting the etched glass substrate to the chemical reinforcing process includes immersing the etched glass substrate in a molten-metal bath containing potassium nitrate ($KNO_3$) maintained at 350 to 450° C., performing counter diffusion of alkali ions ($Na^+$) of the etched glass substrate and alkali ions ($K^+$) of the potassium nitrate ($KNO_3$) during a chemical reaction of the potassium nitrate ($KNO_3$) and the etched glass substrate in the molten-metal bath so that the alkali ions ($K^+$) permeate a surface of the etched glass substrate, and cooling the etched glass substrate to thus form a reinforcing layer on the surface of the etched glass substrate so that a compressive stress occurs on the surface of the etched glass substrate.

22. The method of claim 20, wherein, during a chemical reinforcing process, a filter-support-seat body is formed from the filter-support intermediate by including a reinforcing layer in surfaces of the dummy-defining region and the preliminary cell region to change the dummy-defining region and the preliminary cell region into a dummy region and a cell region.

23. The method of claim 15, wherein the optical filter layer is formed by alternately and repeatedly layering silicon dioxide ($SiO_2$) and titanium oxide ($TiO_2$ or $Ti_3O_5$), silicon dioxide ($SiO_2$) and tantalum oxide ($Ta_2O_5$), or silicon dioxide ($SiO_2$) and niobium pentoxide ($Nb_2O_5$) on one side of a front side and a rear side of the reinforced glass substrate, and by alternately and repeatedly layering silicon dioxide ($SiO_2$) and titanium oxide ($TiO_2$ or $Ti_3O_5$), silicon dioxide ($SiO_2$) and tantalum oxide ($Ta_2O_5$), or silicon dioxide ($SiO_2$) and niobium pentoxide ($Nb_2O_5$) on a remaining side of the reinforced glass substrate so that materials are layered on the remaining side of the reinforced glass substrate in a number of layers that is smaller than a number of layers on one side of the reinforced glass substrate, and the materials layered on the remaining side of the reinforced glass substrate are identical to or different from materials layered on one side of the reinforced glass substrate.

24. The method of claim 15, wherein the optical filter layer includes:
 a resin layer on one side of the front side and the rear side of the reinforced glass substrate;
 silicon dioxide ($SiO_2$) and titanium oxide ($TiO_2$ or $Ti_3O_5$), silicon dioxide ($SiO_2$) and tantalum oxide ($Ta_2O_5$), or silicon dioxide ($SiO_2$) and niobium pentoxide ($Nb_2O_5$), which are alternately and repeatedly layered on the resin layer; and
 silicon dioxide ($SiO_2$) and titanium oxide ($TiO_2$ or $Ti_3O_5$), silicon dioxide ($SiO_2$) and tantalum oxide ($Ta_2O_5$), or silicon dioxide ($SiO_2$) and niobium pentoxide ($Nb_2O_5$), which are alternately and repeatedly layered on a remaining side of the reinforced glass substrate to secure a layering thickness that is smaller than a layering thickness on the resin layer and to layer materials that are identical to materials layered on the resin layer, and
the resin layer includes a near-infrared-absorbing pigment in a polymer resin containing urethane and acryl.

25. The method of claim 15, further comprising:
a wet treatment step between the fifth step and the sixth step or between the sixth step and the seventh step,
wherein the wet treatment step includes
applying a wet etching solution containing non-hydrofluoric acid or hydrofluoric acid to the etched glass substrate to thus partially etch a surface of the etched glass substrate between the fifth step and the sixth step, or
applying the wet etching solution containing the non-hydrofluoric acid or the hydrofluoric acid to the reinforced glass substrate to thus partially etch a surface of the reinforced glass substrate between the sixth step and the seventh step.

26. The method of claim 15, further comprising:
after the seventh step,
an eighth step of, during application of external force to the reinforced glass substrate and the optical filter layer, separating a plurality of filter-support-seat bodies from the reinforced glass substrate along the plurality of etched blow holes for forming cracks, and subdividing the optical filter layer on the plurality of filter-support-seat bodies using the plurality of etched blow holes for forming cracks as a crack transfer body, thus forming an optical-filter-subdivision layer on an individual filter-support-seat body.

\* \* \* \* \*